United States Patent
Hasunuma

(10) Patent No.: US 10,281,349 B2
(45) Date of Patent: *May 7, 2019

(54) PRESSURE DECTION DEVICE FOR DETECTING PRESSURE OF FLUID CIRCULATED THROUGH FLOW CHANNEL

(71) Applicant: Surpass Industry Co., Ltd., Gyoda-shi, Saitama (JP)

(72) Inventor: Masahiro Hasunuma, Saitama (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 51 days.

This patent is subject to a terminal disclaimer.

(21) Appl. No.: 15/427,366

(22) Filed: Feb. 8, 2017

(65) Prior Publication Data

US 2017/0370792 A1    Dec. 28, 2017

(30) Foreign Application Priority Data

Jun. 22, 2016  (JP) ................. 2016-123472

(51) Int. Cl.
*G01L 9/00* (2006.01)
*G01L 19/00* (2006.01)
*G01L 19/06* (2006.01)

(52) U.S. Cl.
CPC ........ *G01L 9/0051* (2013.01); *G01L 19/0007* (2013.01); *G01L 19/069* (2013.01); *G01L 19/0627* (2013.01); *G01L 9/0052* (2013.01); *G01L 19/0046* (2013.01); *G01L 19/0084* (2013.01)

(58) Field of Classification Search
None
See application file for complete search history.

(56) References Cited

U.S. PATENT DOCUMENTS 6,640,639 B2    11/2003  Okawa
2003/0037618 A1  2/2003  Okawa
(Continued)

FOREIGN PATENT DOCUMENTS

EP    3 156 705 A1    4/2017
JP    4846140 B2    12/2011
JP    5987100 B1    9/2016

OTHER PUBLICATIONS

Extended European Search Report (EESR) dated Jul. 31, 2017 (English Translation).
(Continued)

*Primary Examiner* — Andre J Allen
(74) *Attorney, Agent, or Firm* — Muncy, Geissler, Olds & Lowe, P.C.

(57) ABSTRACT

Provided is a pressure detection device including a pressure detection unit configured to detect a pressure to be transmitted to a pressure sensor, and a flow channel unit on which the pressure detection unit is disposed. The pressure detection unit) includes a pressure sensor and a conductive protective film disposed in contact with the pressure sensor, the conductive protective film breaking contact between the pressure sensor and a fluid. The conductive protective film is formed of a conductive fluororesin material including a fluororesin material and a conductive material dispersed in the fluororesin material and is connected to a ground portion maintained at a ground potential.

4 Claims, 12 Drawing Sheets

(56) References Cited

U.S. PATENT DOCUMENTS

2006/0075822 A1* 4/2006 Aizawa ................ G01L 9/0042
73/715
2013/0001525 A1 1/2013 Hu et al.
2015/0260601 A1* 9/2015 Hasunuma .......... G01L 19/0092
73/714
2017/0108149 A1 4/2017 Imai et al.
2017/0370792 A1* 12/2017 Hasunuma .......... G01L 19/0007

OTHER PUBLICATIONS

Extended European Search Report (EESR) dated Aug. 3, 2017 for Co-pending U.S. Appl. No. 15/427,097 (English Translation).

* cited by examiner

PRESSURE DECTION DEVICE FOR DETECTING PRESSURE OF FLUID CIRCULATED THROUGH FLOW CHANNEL

CROSS-REFERENCE TO RELATED APPLICATIONS

This application is based on Japanese Patent Application No. 2016-123472, the contents of which are incorporated herein by reference in its entirety.

TECHNICAL FIELD

The present disclosure relates to a pressure detection device that detects a pressure of a fluid circulated through a flow channel.

BACKGROUND ART

A pressure sensor including a housing provided with a flow channel to which a liquid, such as a drug solution, is guided, and a sensor element for detecting a pressure of liquid to be transmitted to a pressure-sensitive portion in contact with the liquid guided to the flow channel has been conventionally known (for example, see the Publication of Japanese Patent No. 4846140 (hereinafter referred to as "JP 4846140")).

In the pressure sensor disclosed in JP 4846140, since the housing and the pressure-sensitive portion are formed of a material including, as a main component, a fluorine-contained resin having an excellent chemical resistance, static electricity is likely to be accumulated on the housing and the pressure-sensitive portion due to a friction with the liquid. Accordingly, the pressure sensor disclosed in JP 4846140 has a structure in which aluminum foil is attached to the surface of the sensor element that is in contact with the pressure-sensitive portion, thereby allowing the static electricity accumulated on the pressure-sensitive portion to be discharged to a shield line.

SUMMARY

Technical Problem

However, the inventors have obtained findings that even when the structure for bringing the pressure-sensitive portion into contact with aluminum foil, such as the pressure sensor disclosed in JP 4846140, is employed, a phenomenon in which the static electricity accumulated on the pressure-sensitive portion is discharged to the sensor element may occur. When the static electricity accumulated on the pressure-sensitive portion is discharged to the sensor element, defects such as a defect that the sensor element is damaged and a defect that a part of the pressure-sensitive portion is damaged and the liquid contacts the sensor element occur.

In the structure in which the pressure-sensitive portion is brought into contact with the aluminum foil, static electricity is accumulated on the pressure-sensitive portion. This is considered to be because the static electricity accumulated on the surface of the pressure-sensitive portion that is in contact with the liquid is not guided to the surface of the pressure-sensitive portion that is in contact with the aluminum foil. Such a phenomenon is especially noticeable when the fluid containing a small number of impurities and having a high volume resistivity (for example, a fluid such as ultrapure water having a volume resistivity of 15 MQ·cm or more).

Further, since the pressure sensor disclosed in JP 4846140 has a structure in which the aluminum foil is sandwiched between the pressure-sensitive portion and the sensor element, the transmission accuracy of the pressure of the liquid from the pressure-sensitive portion to the sensor element may deteriorate.

The present disclosure has been made in view of the above-mentioned circumstances, and an object of the present disclosure is to provide a pressure detection device capable of highly accurately detecting a pressure of a fluid, while preventing the occurrence of a defect that static electricity is accumulated on a fluid contact surface of a thin film-like protective portion which breaks contact between a pressure detection portion and the fluid.

Solution to Problem

To solve the above-mentioned problem, the present disclosure employs the following solutions.

A pressure detection device according to one aspect of the present disclosure includes: a pressure detection unit configured to detect a pressure to be transmitted to a pressure detection portion; and a flow channel unit having a flow channel formed therein, the pressure detection unit being disposed on the flow channel unit. The pressure detection unit includes: the pressure detection portion; and a thin film-like protective portion disposed in contact with the pressure detection portion, the protective portion breaking contact between the pressure detection portion and a fluid. The protective portion is formed of a conductive fluororesin material including a fluororesin material and a conductive material dispersed in the fluororesin material, and is connected to a ground portion maintained at a ground potential.

In the pressure detection device according to one aspect of the present disclosure, since the thin film-like protective portion is formed of a conductive fluororesin material and is connected to the ground portion, static electricity generated on the fluid contact surface of the protective portion due to a friction with the fluid is guided to the ground portion via the inside of the protective portion from the fluid contact surface. Further, since the thin film-like protective portion is disposed in contact with the pressure detection portion without involving another member, the pressure of the fluid can be highly accurately transmitted from the protective portion to the pressure detection portion.

Thus, the pressure detection device according to one aspect of the present disclosure can highly accurately detect the pressure of a fluid, while preventing the occurrence of a defect that static electricity is accumulated on the fluid contact surface of the thin film-like protective portion which breaks contact between the pressure detection portion and the fluid.

In the pressure detection device according to one aspect of the present disclosure, the conductive material may be carbon nanotubes and the conductive fluororesin material may contain the carbon nanotubes at a rate of 0.020 weight % to 0.030 weight %.

Even with such a small ratio of carbon nanotubes, 0.020 weight % or more of the carbon nanotubes are dispersed in the fluororesin material to apply a constant conductivity to the protective portion, thereby making it possible to prevent charging of static electricity. This is because when tube-like carbon nanotubes having a predetermined length are used as a conductive material, only a small number of carbon nanotubes are needed to apply a conductivity, unlike other granular conductive material, such as carbon black and iron powder.

Further, since the rate of the carbon nanotubes contained in the conductive fluororesin material is a small rate of 0.030 weight % or less, the contamination of the fluid due to the contact between the protective portion and the fluid can be prevented, unlike other granular conductive materials such as carbon black and iron powder.

In the pressure detection device according to one aspect of the present disclosure, the pressure detection portion may include: a thin film-like diaphragm including a first surface in contact with the protective portion; and a resistor that is attached to a second surface of the diaphragm, the second surface of the diaphragm being not in contact with the protective portion, and the diaphragm may be formed of a non-conductive material.

With this structure, the resistor can be appropriately isolated from the outside and the pressure can be detected highly accurately. Further, when the diaphragm in contact with the protective portion is formed of a non-conductive material, static electricity is not transmitted from the protective portion to the diaphragm. However, since the protective portion is connected to the ground portion, the static electricity can be guided to the ground portion.

Advantageous Effects

According to the present disclosure, it is possible to provide a pressure detection device capable of highly accurately detecting a pressure of a fluid, while preventing the occurrence of a defect that static electricity is accumulated on the fluid contact surface of the thin film-like protective portion which breaks contact between the pressure detection portion and the fluid.

DESCRIPTION OF EMBODIMENTS

First Embodiment

A pressure detection device 100 according to a first embodiment of the present disclosure will be described below with reference to the drawings.

Figure 1:
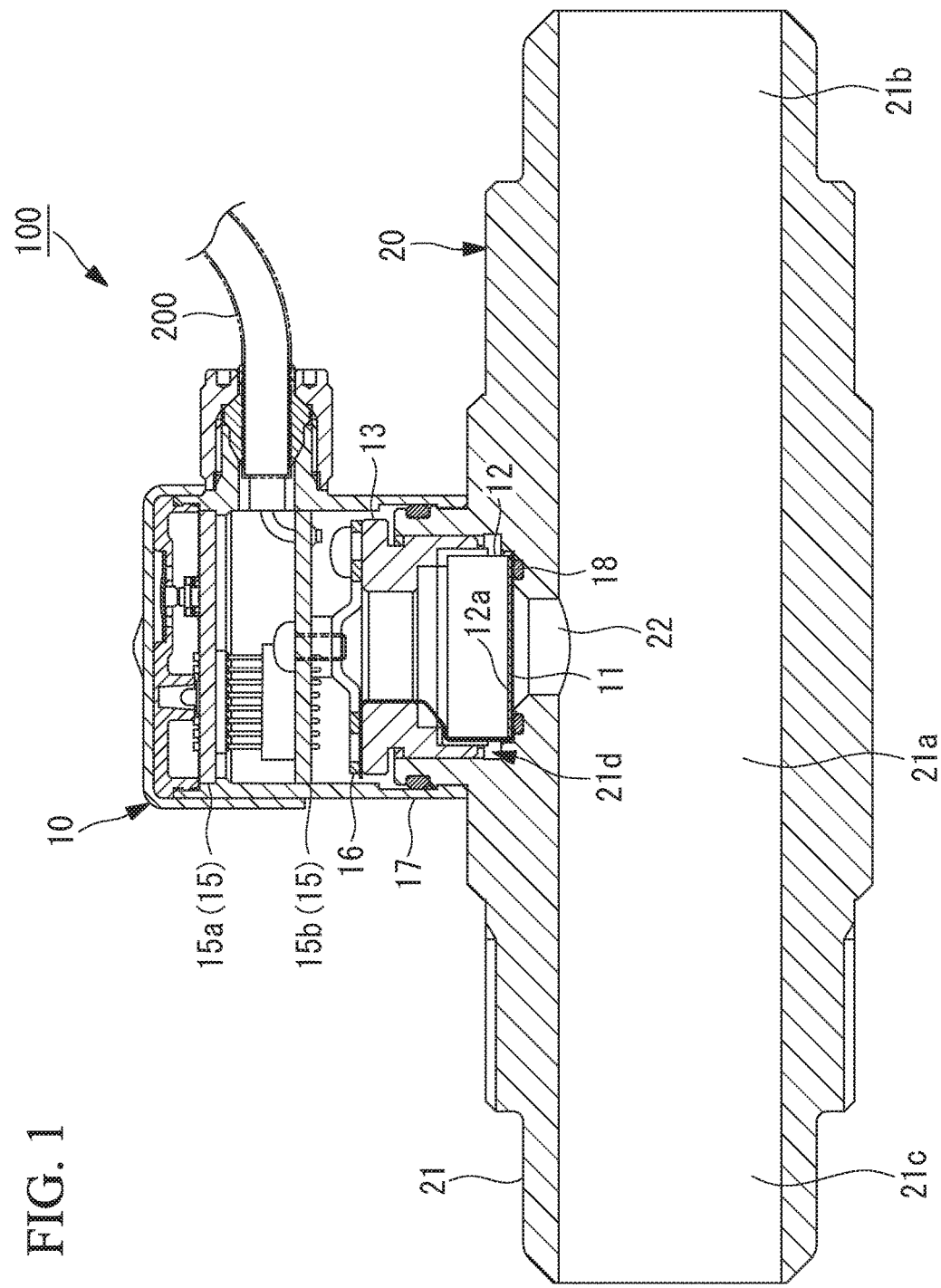
FIG. 1 is a longitudinal sectional view showing a pressure detection device of a first embodiment.

As shown in FIG. 1, the pressure detection device 100 of the first embodiment includes a pressure detection unit 10 for detecting a pressure of a fluid, and a flow channel unit 20 including a flow channel body 21 having a flow channel 21a formed therein. The flow channel 21a is a flow channel through which the fluid is caused to flow along a linear circulation direction from an inflow port 21b to an outflow port 21c.

The flow channel unit 20 is provided with an introduction flow channel 22 which is opened to the flow channel 21a. The pressure detection unit 10 is disposed at a position of the flow channel unit 20 that is in contact with the fluid flowing into the introduction flow channel 22.

The flow channel body 21 is formed of a fluororesin material such as PTFE (polytetrafluoroethylene), PCTFE (polychlorotrifluoroethylene), or PFA (tetrafluoroethylene-perfluoroalkyl vinyl ether copolymer).

The pressure detection unit 10 shown in FIG. 1 is a device that detects a pressure of a fluid to be transmitted to a diaphragm 12a.

The fluid used in the first embodiment is a drug solution, solvent, pure water, or the like which is used in a semiconductor manufacturing process by a semiconductor manufacturing device. In the semiconductor manufacturing process, a fluid with high cleanliness is used. For example, ultrapure water having a volume resistivity of 15 M·cm or more is used.

Figure 2:
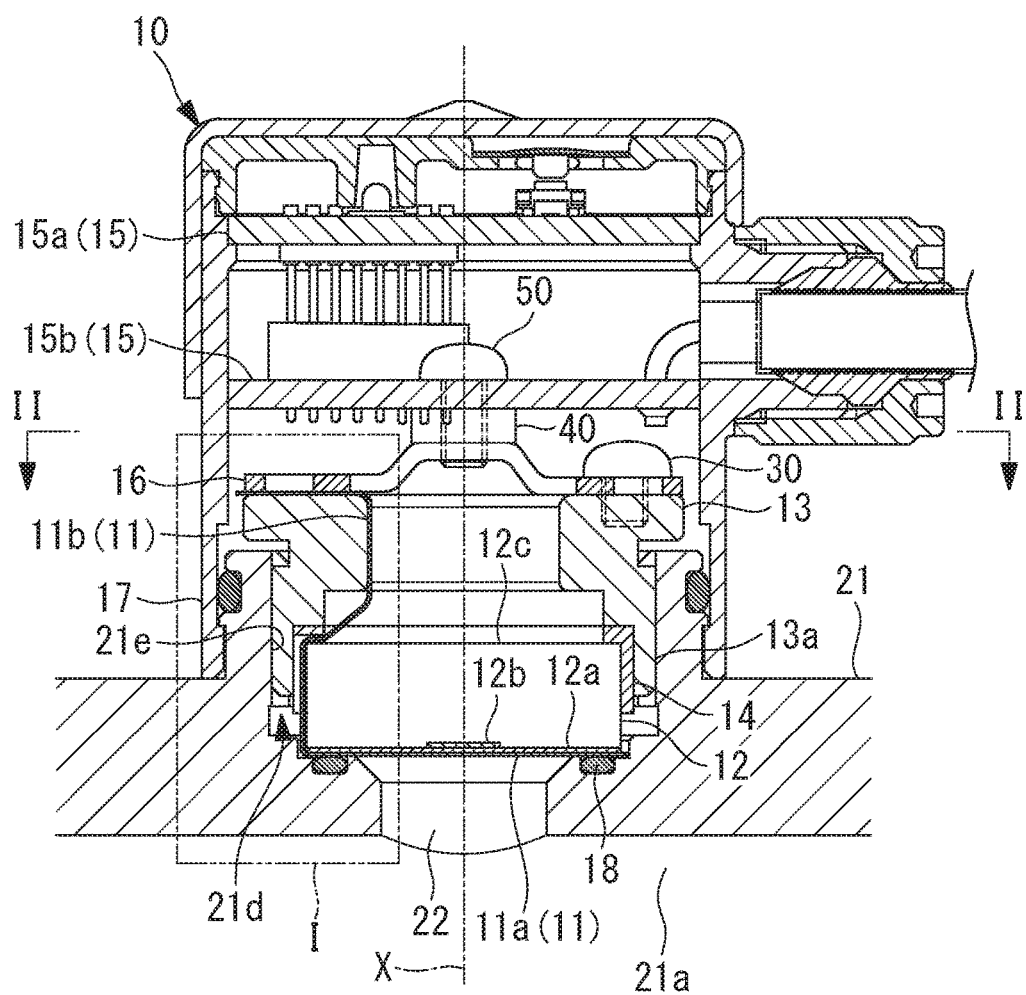
FIG. 2 is a partial enlarged view of a pressure detection unit shown in FIG. 1.
Figure 3:
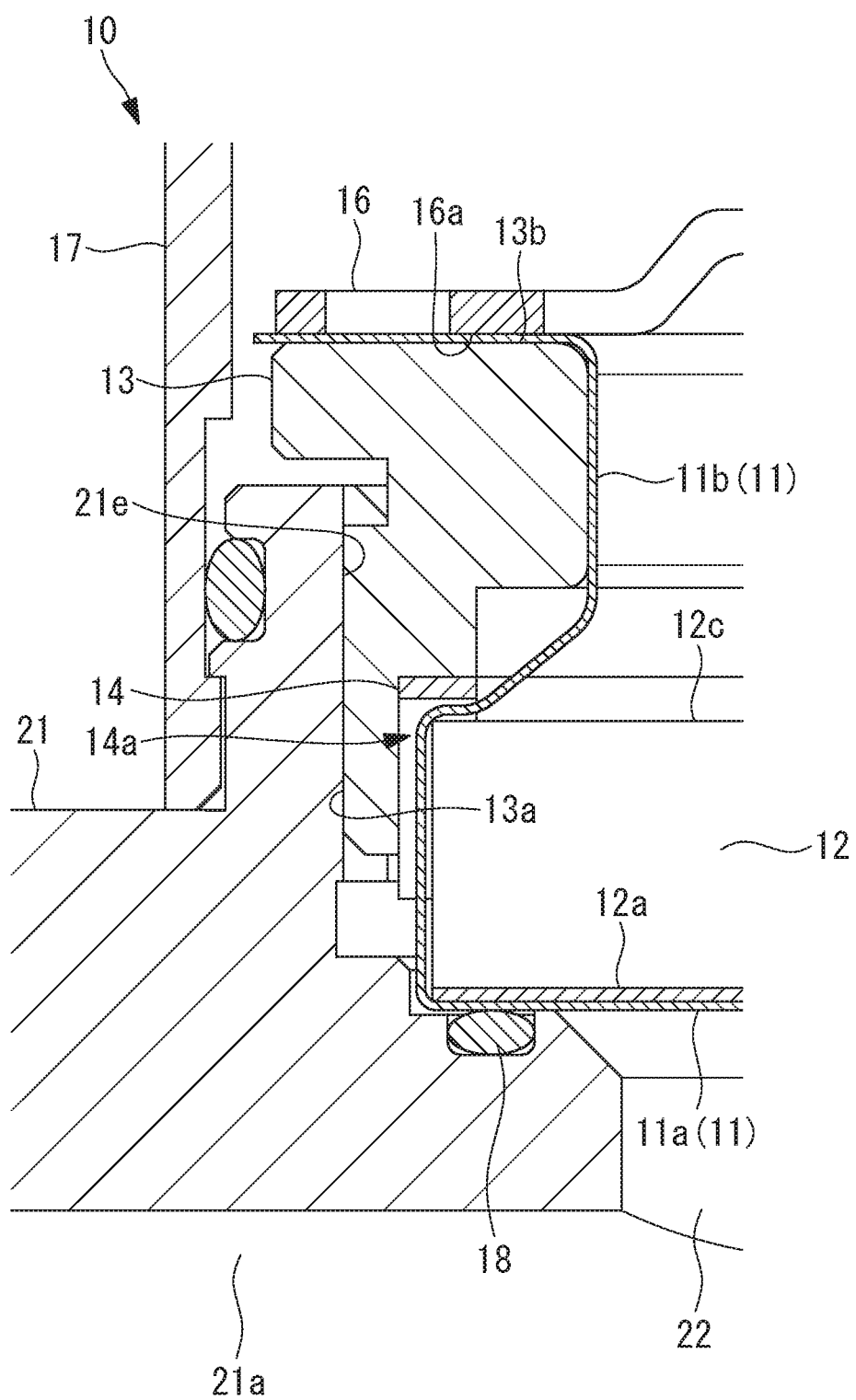
FIG. 3 is a partial enlarged view of a portion indicated by "I" in the pressure detection unit shown in FIG. 2.

FIG. 1 is a longitudinal sectional view showing the pressure detection device 100 of the first embodiment. FIG. 2 is a partial enlarged view of the pressure detection unit 10 shown in FIG. 1. FIG. 3 is a partial enlarged view of a portion indicated by "I" in the pressure detection unit 10 shown in FIG. 2.

As shown in FIGS. 1 to 3, the pressure detection unit 10 includes: a thin film-like conductive protective film (protective portion) 11 which breaks contact between the diaphragm 12a and the fluid; a pressure sensor (pressure detection portion) 12 including the diaphragm 12a; an outer holder 13 which holds the pressure sensor 12 in a state where the pressure sensor 12 is disposed in a recess 21d which is formed in the flow channel body 21; an inner holder 14 which is fixed to the pressure sensor 12; a sensor substrate 15 for transmitting power and electric signals between the pressure sensor 12 and a cable 200 which is connected to an external device (not shown); a substrate holding member 16 which holds the sensor substrate 15 with respect to the outer holder 13; a housing 17 which accommodates the sensor substrate 15; and an O-ring 18.

The components included in the pressure detection unit 10 will be described below.

The conductive protective film 11 is formed into a thin-film shape which breaks contact between the diaphragm 12a and the fluid and is disposed in contact with the diaphragm 12a.

Figure 4:
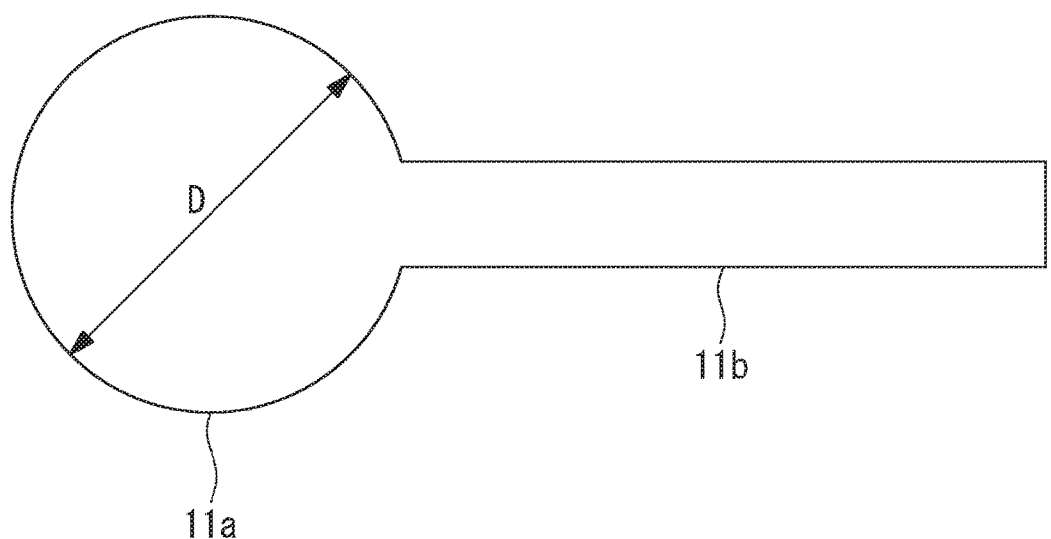
FIG. 4 is a plan view of a conductive protective film shown in FIG. 2.

As shown in FIG. 4, the conductive protective film 11 includes: a protective film body 11a having a circular shape with a diameter D in plan view; and a band-like portion 11b which is coupled to the protective film body 11a. The protective film body 11a and the band-like portion 11b are integrally formed of a conductive resin material as described later.

The protective film body 11a is joined to a lower surface of the diaphragm 12a with an adhesive or the like. As shown in FIGS. 2 and 3, the band-like portion 11b is held in a state where the band-like portion 11b is sandwiched between an upper surface 13b of the outer holder 13 and a lower surface 16a of the substrate holding member 16.

As described later, the outer holder 13 and the substrate holding member 16 are each formed of a metal member such as stainless steel. The substrate holding member 16 is electrically connected to a ground line of the sensor substrate 15. Accordingly, the outer holder (ground portion) 13 and the substrate holding member (ground portion) 16 are maintained at a ground potential. As described later, the conductive protective film 11 has a conductivity, so that the outer holder 13 and the substrate holding member 16 are electrically conductive.

The conductive protective film 11 of the first embodiment is formed of a conductive fluororesin material including a fluororesin material and carbon nanotubes (conductive material) dispersed in the fluororesin material.

Examples of the fluororesin material used herein include PTFE, PCTFE, and PFA as mentioned above.

As the fluororesin material, powder-like material (for example, PTFE G 163 manufactured by ASAHI GLASS CO., LTD.) can be used.

Carbon nanotubes having, for example, the following characteristics are desirably used.
  having a fiber length in a range from 50 μm to 150 μm.
  having a fiber diameter in a range from 5 nm to 20 nm.
  having a bulk density in a range from 10 mg/cm$^3$ to 70 mg/cm$^3$.
  having a G/D ratio in a range from 0.7 to 2.0.
  having purity of 99.5% or more.
  formed of multiple layers (for example, 4 to 12 layers).
  In this case, the reason why the fiber length of carbon nanotubes is set to 50 μm or more is that when the carbon nanotubes are dispersed in the fluororesin material, only a small number of carbon nanotubes are needed to apply a sufficiently conductivity.

The G/D ratio is a value indicating a ratio of G-band peaks and D-band peaks which appear in a Raman spectrum of the carbon nanotubes. The G-band is derived from a graphite structure, and the D-band is derived from a defect. The G/D ratio indicates a ratio of purity of crystal to a defect concentration in the carbon nanotubes.

Figure 5:
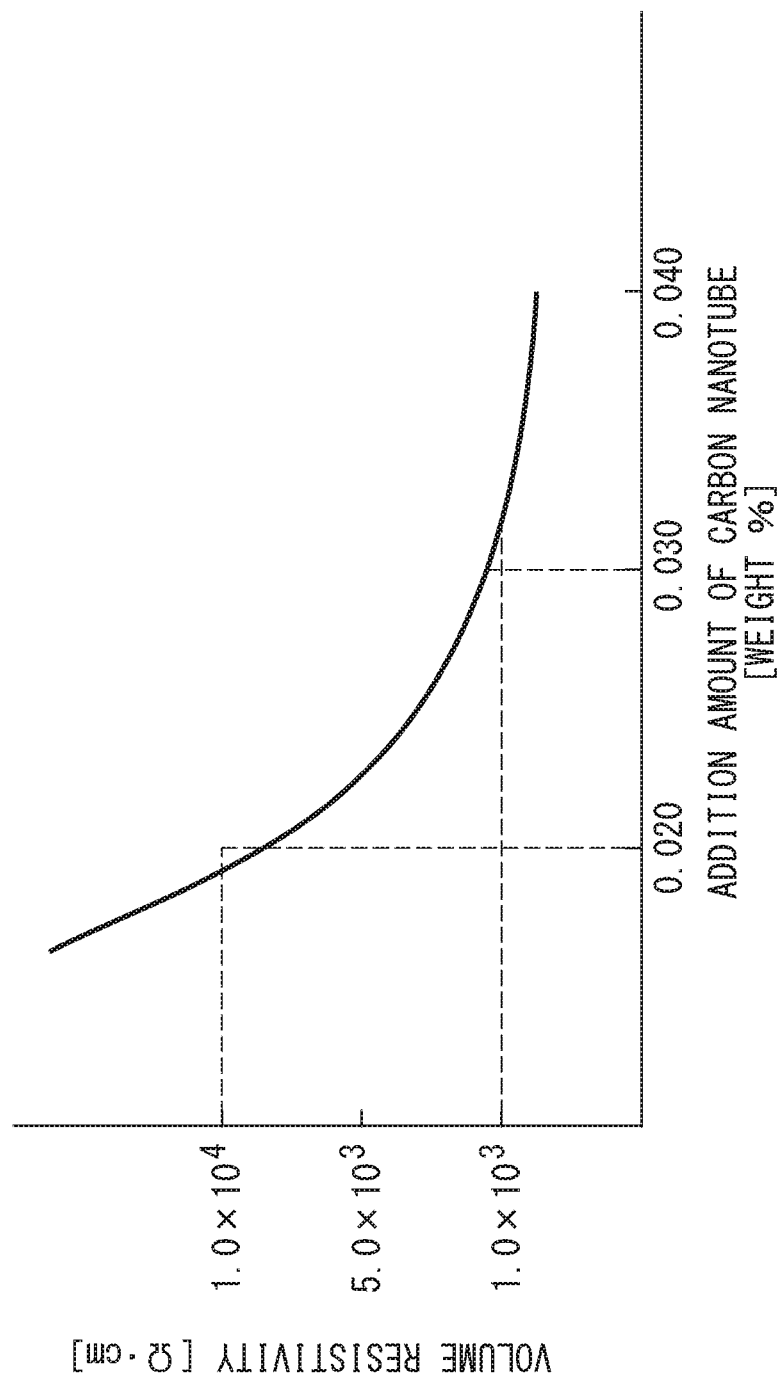
FIG. 5 is a graph showing a relationship between an additive amount of carbon nanotubes and a volume resistivity of a conductive fluororesin material.

The inventors have studied about the relationship between the additive amount (weight %) of carbon nanotubes dispersed in the fluororesin material and the volume resistivity [Ω·cm] of the conductive fluororesin material including the fluororesin material and the carbon nanotubes dispersed in the fluororesin material, and have obtained the results as shown in FIG. 5.

FIG. 3 shows the results of measurement of the volume resistivity of test pieces on the basis of "testing method for resistivity of conductive plastics with a four-point probe array" defined in JIS K 7194.

A plurality of test pieces was prepared by performing melt-kneading using a kneader and then performing compression molding using a compression molding machine to thereby process the test pieces into a size compliant with JIS K 7194.

PTFE G163 manufactured by ASAHI GLASS CO., LTD. was used as the fluororesin material for creating the test pieces.

For measurement of the volume resistivity, a resistivity meter using a 4-point probe method compliant with JIS K 7194 was used. The 4-point probe method is a method in which four needle-like probes (electrodes) are brought into contact with the test pieces and the resistance of each test piece is obtained based on a current caused to flow between two outside probes and a potential difference generated between two inside probes.

The volume resistivity was calculated by averaging the measurement values obtained at a plurality of positions from a plurality of test pieces.

According to the results shown in FIG. 5, the additive amount of carbon nanotubes was set in a range from 0.020 weight % to 0.030 weight %, so that the volume resistivity of the conductive fluororesin material was larger than $1.0 \times 10^3$ Ω·cm and less than $1.0 \times 10^4$ Ω·cm. This volume resistivity value is sufficiently smaller than the value ($10^{18}$ Ω·cm) of the volume resistivity of the fluororesin material in which carbon nanotubes are not dispersed.

Figure 6:
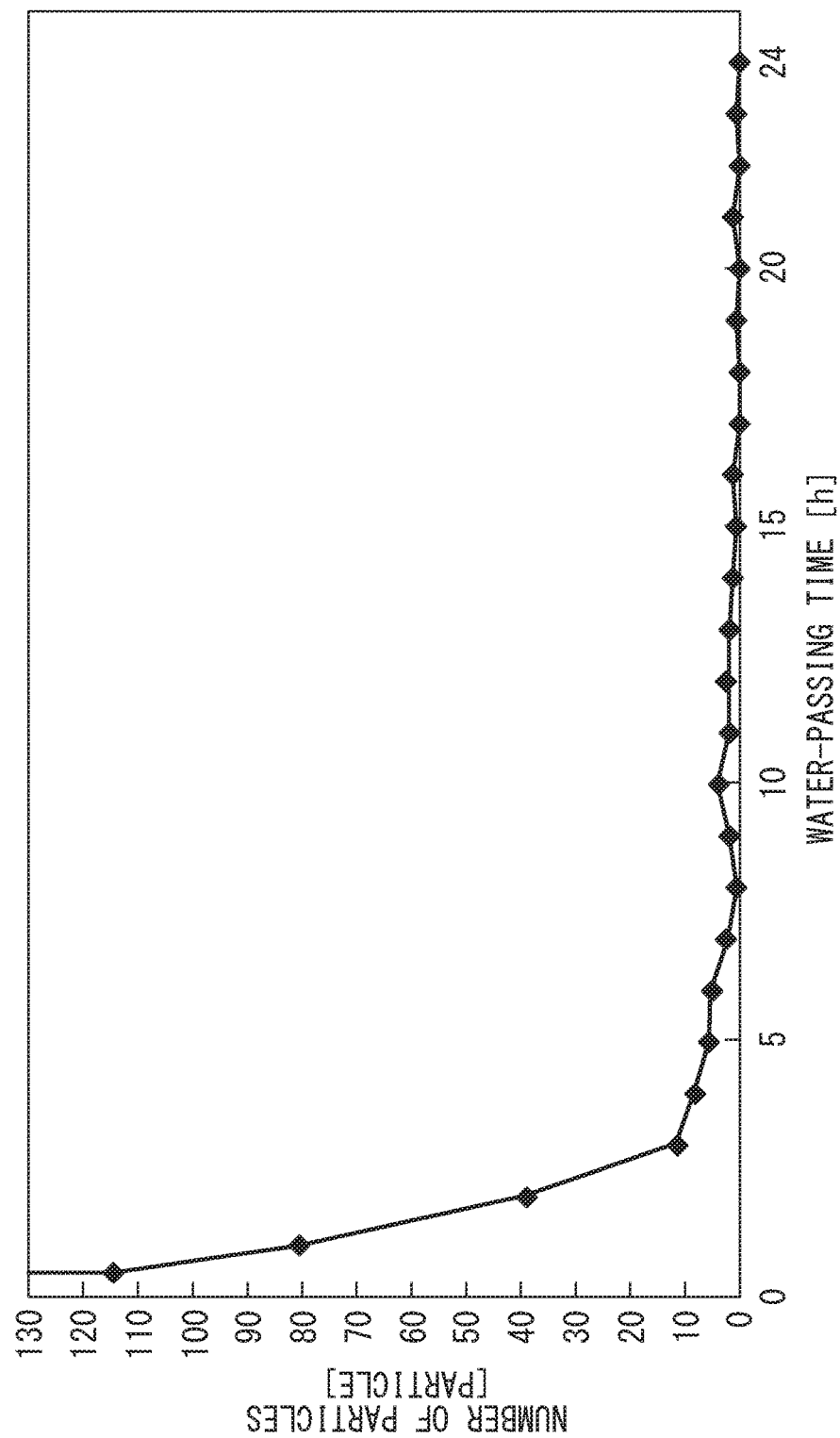
FIG. 6 is a graph showing a relationship between a time for flowing water and the number of particles.

The present inventors measured particles contained in the fluid circulated through the flow channel formed of a conductive fluororesin material containing carbon nanotubes with an additive amount of 0.025 weight %. FIG. 6 is a measurement result showing the relationship between a time for flowing water during which pure water was circulated and the number of particles measured by a particle counter (not shown).

The number of particles described herein refers to the number of particles which are contained in 1 ml of pure water and have a size of 0.04 μm or more.

In the measurement shown in FIG. 6, the flow rate of pure water circulated through the flow channel was set to 0.5 liters/min. Further, an interruption state in which the circulation of pure water is interrupted and a circulation state in which the pure water is circulated were switched at intervals of five seconds. The temperature of the pure water was set to 25° C.

Although not shown in FIG. 6, the number of particles at the time of start of measurement (time for flowing water is zero) was about 340. After that, the number of particles gradually decreases over time, and after a lapse of a water flowing time of four hours, the number of particles is maintained at 10 or less.

Thus, in the conductive protective film 11 of the first embodiment, since the rate of carbon nanotubes contained in the conductive fluororesin material is a small rate of 0.030 weight % or less, the contamination of the fluid due to contact with the fluid can be prevented, unlike other granular conductive materials such as carbon black and iron powder.

The pressure sensor 12 includes: the diaphragm 12a which is formed into a thin film shape; a strain gauge 12b which is a resistor to be attached to the diaphragm 12a; and a base portion 12c which holds the diaphragm 12a. The pressure sensor 12 is a strain gauge pressure sensor which outputs a pressure signal corresponding to the resistance value of the strain gauge 12b that varies depending on the pressure to be transmitted to the diaphragm 12a.

The diaphragm 12a has a lower surface (first surface) in contact with the conductive protective film 11, and an upper surface (second surface) that is not in contact the conductive protective film 11, and the strain gauge 12b is attached to the upper surface of the diaphragm 12a.

The diaphragm 12a is formed of a non-conductive material (such as sapphire or ceramics) having a corrosion resistance and a chemical resistance.

The outer holder 13 is made of metal (for example, made of stainless steel) formed into a cylindrical shape about the axis line X, and a male screw 13a is formed on the outer periphery of the outer holder 13. The outer holder 13 allows the pressure sensor 12 to be disposed in the recess 21d of the flow channel body 21. The outer holder 13 holds the pressure sensor 12 at a constant position with respect to the flow channel body 21 by fastening the male screw 13a formed on the outer periphery of the outer holder 13 to a female screw 21e formed on the inner periphery of the recess 21d.

Figure 7:
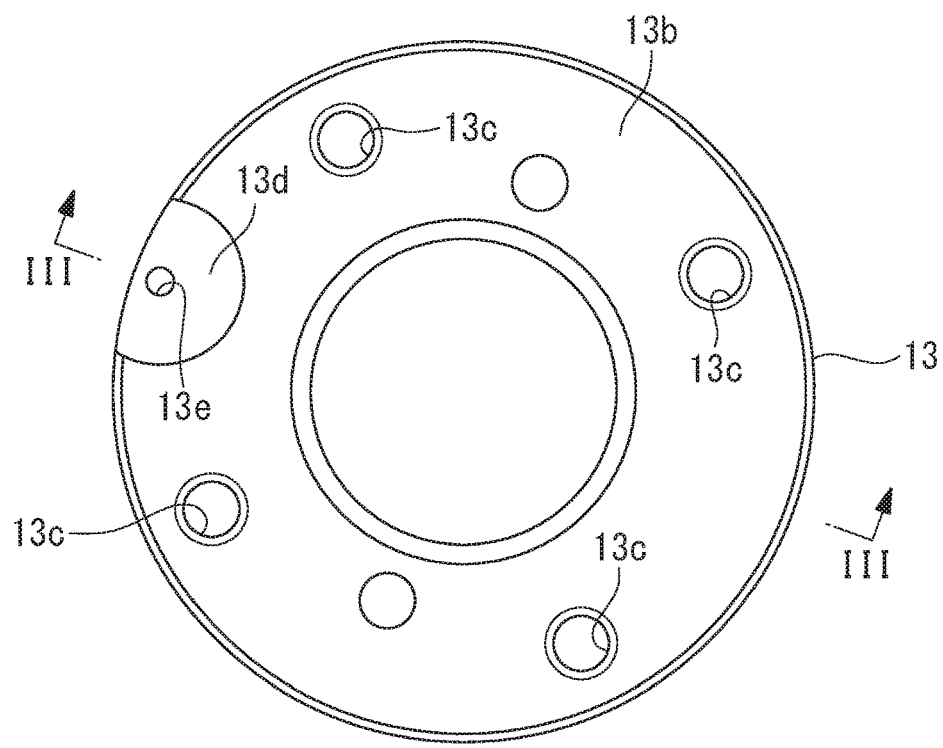
FIG. 7 is a plan view of an outer holder shown in FIG. 2 as viewed along a direction II-II.

As shown in FIG. 7, fastening holes 13c in which fastening bolts 30 for fixing the substrate holding member 16 to the outer holder 13 are fastened are formed in the upper surface 13b of the outer holder 13.

Figure 8:
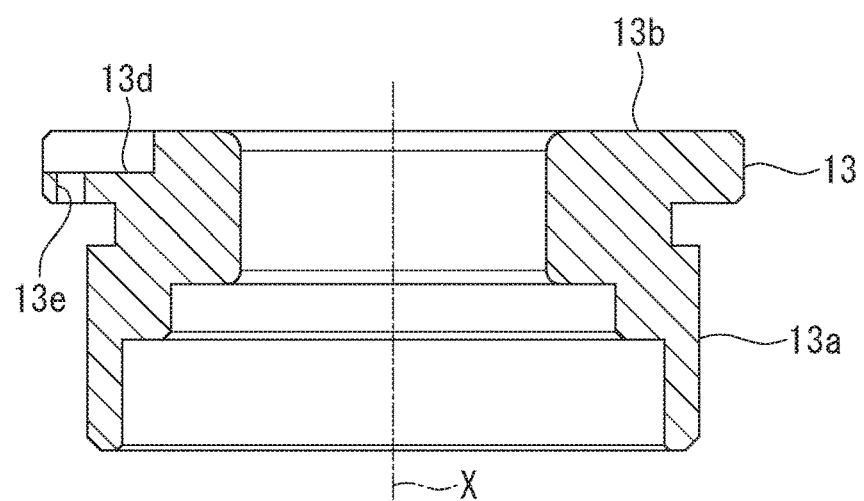
FIG. 8 is a sectional view taken along a line III-III of the outer holder shown in FIG. 7.

As shown in FIGS. 7 and 8, a recess 13d and a through-hole 13e which penetrates downwardly from the recess 13d are formed in the upper surface 13b of the outer holder 13.

The through-hole 13e is a hole for inserting a rotation preventing pin (not shown) which prevents the outer holder 13 from being rotated about the axis line X after the male screw 13a of the outer holder 13 is fastened to the female screw 21e of the flow channel body 21. The rotation preventing pin which is made of metal and inserted into the through-hole 13e is inserted into the flow channel body 21, which is formed of a fluororesin material, so that the outer holder 13 is fixed so as not to rotate about the axis line X.

When the rotation preventing pin is inserted into the recess 13d, the recess 13d is provided in such a manner that an upper end of the rotation preventing pin is prevented from projecting from the upper surface 13b of the outer holder 13.

The inner holder 14 is a member made of metal (for example, made of stainless steel) formed into a cylindrical shape about the axis line X, and is joined to the base portion 12c of the pressure sensor 12 with an adhesive or the like.

Figure 9:
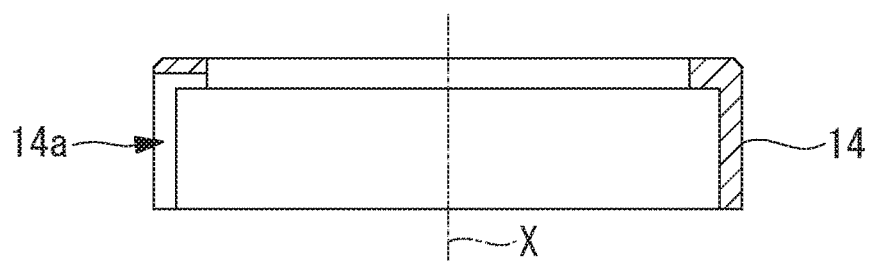
FIG. 9 is a longitudinal sectional view of an inner holder shown in FIG. 2.
Figure 10:
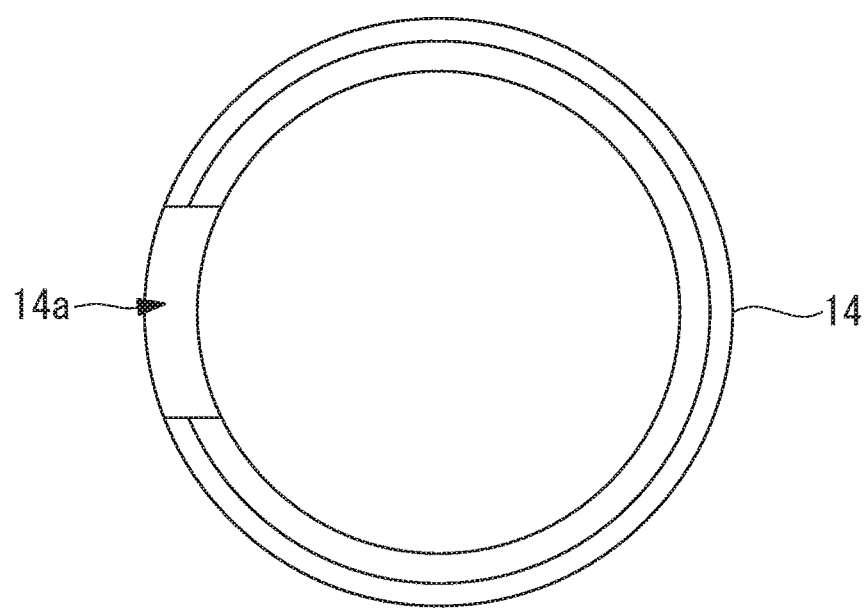
FIG. 10 is a bottom view of the inner holder shown in FIG. 9.

As shown in FIG. 9 (which is a longitudinal sectional view of the inner holder 14) and FIG. 10 (which is a bottom view of the inner holder 14), a notch portion 14a is formed at a portion along the peripheral direction about the axis line. The notch portion 14a is provided to guide the band-like portion 11b of the conductive protective film 11 from the diaphragm 12a of the pressure sensor 12 to the upper surface 13b of the outer holder 13. As shown in FIG. 3, the band-like portion 11b is guided to the upper surface 13b of the outer holder 13 in a state where the band-like portion 11b is not sandwiched between the base portion 12c and the inner holder 14.

The outer diameter of the inner holder 14 about the axis line X is slightly smaller than the inner diameter of a portion of the outer holder 13 where the inner holder 14 is accommodated. Accordingly, when the male screw 13a of the outer holder 13 is fastened to the female screw 21e of the flow channel body 21, the inner holder 14 is prevented from being rotated about the axis line X. Consequently, the occurrence of a defect that the inner holder 14 is rotated together with the outer holder 13 can be prevented.

Further, since the band-like portion 11b of the conductive protective film 11 is disposed between the inner holder 14 and the base portion 12c of the pressure sensor 12, when the outer holder 13 is fastened, the outer holder 13 is prevented from coming into contact with the band-like portion 11b and thus the band-like portion 11b is prevented from being damaged.

The sensor substrate 15 includes: an amplifier circuit (not shown) which amplifies the pressure signal output from the pressure sensor 12; an interface circuit which transmits the pressure signal amplified by the amplifier circuit to a pressure signal line (not shown) of the cable 200; and a power supply circuit (not shown) which transmits a power supply voltage, which is supplied from the outside via the cable 200, to the pressure sensor 12.

The sensor substrate 15 includes a first sensor substrate 15a which is disposed on an upper side of the sensor substrate 15, and a second sensor substrate 15b which is disposed on a lower side of the sensor substrate 15. The second sensor substrate 15b is provided with a ground line which is electrically connected to the ground line of the cable 200.

As shown in FIG. 2, the second sensor substrate 15b is fastened to the substrate holding member 16 with a fastening bolt 50 made of metal (for example, made of stainless steel) in a state where a spacer 40 made of metal (for example, made of stainless steel) is sandwiched therebetween. The fastening bolt 50 is in contact with the ground line of the second sensor substrate 15b. Accordingly, the fastening bolt 50, the spacer 40, and the substrate holding member 16 are each maintained at the ground potential.

As described above, the conductive protective film 11 is electrically conductive with the outer holder 13 and the substrate holding member 16. Therefore, the conductive protective film 11 is maintained at the ground potential in a state where the conductive protective film 11 is electrically conductive with the ground line of the second sensor substrate 15b.

The substrate holding member 16 is a member which is made of metal (for example, made of stainless steel) and holds the sensor substrate 15 with respect to the outer holder 13, and is formed into an annular shape about the center axis of the axis line X.

Figure 11:
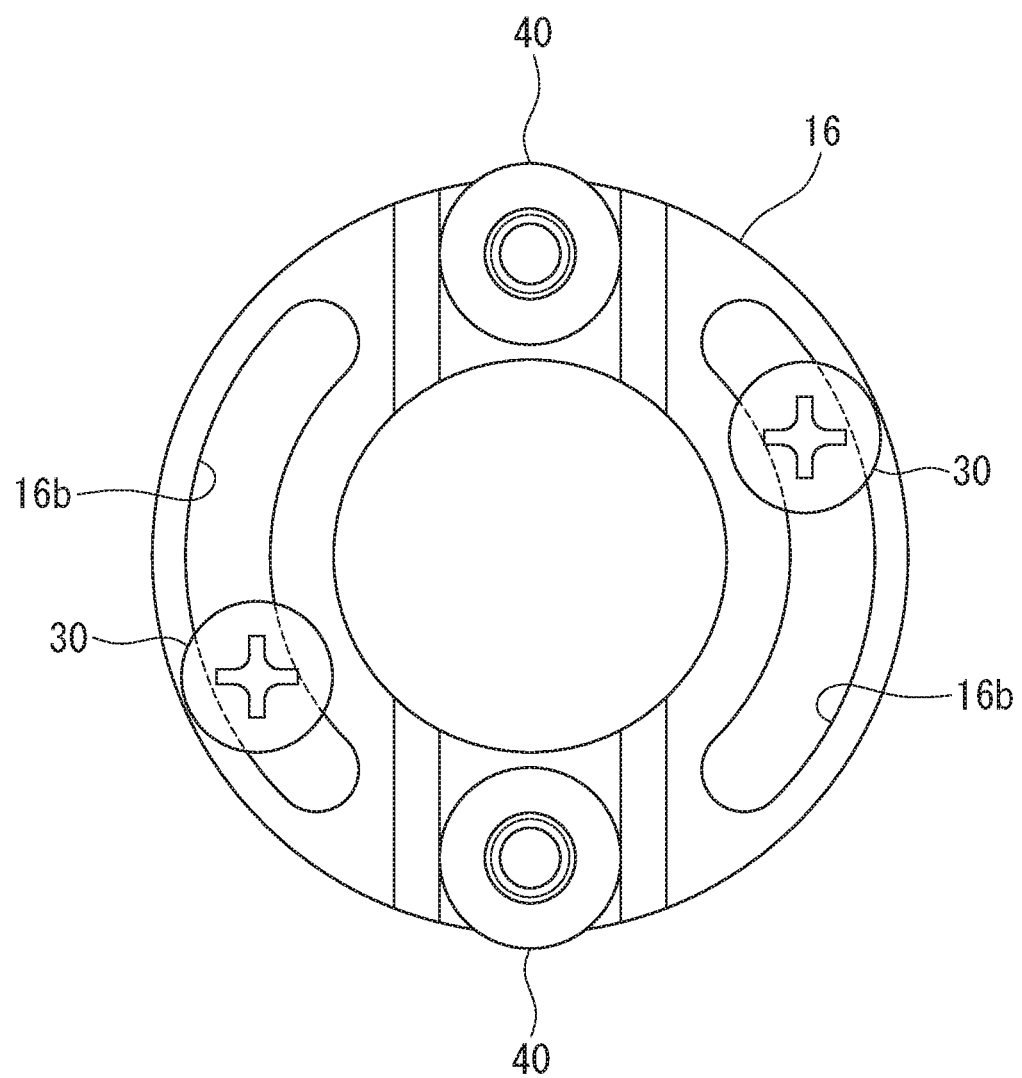
FIG. 11 is a plan view of a substrate support member shown in FIG. 2 as viewed along the direction II-II.

As shown in FIG. 11, the substrate holding member 16 is provided with two through-holes 16b having a constant length along the peripheral direction about the axis line X. The substrate holding member 16 is fixed to the outer holder 13 in such a manner that two fastening bolts 30 inserted into the through-holes 16b formed at two locations are fastened to the fastening holes 13c of the outer holder 13.

The reason why the through-holes 16b of the substrate holding member 16 have a constant length along the peripheral direction about the axis line X is that the rotational position of the substrate holding member 16 about the axis line X is adjusted. Since the outer holder 13 is fastened to the flow channel body 21 with screws, it is difficult to strictly match the position of the fastening hole 13c of the outer holder 13 about the axis line X with a preliminarily fixed position. Thus, the formation of the through-holes 16b having a constant length makes it possible to adjust the rotational position of the substrate holding member 16 about the axis line X.

Note that when the rotational position of the substrate holding member 16 about the axis line X is adjusted, the direction in which the flow channel 21a extends can be matched with the direction in which the cable 200 extends. By matching these directions, the installation area when a plurality of pressure detection devices 100 are arranged can be reduced.

The housing 17 is a member formed into a cylindrical shape about the axis line X, and the inner periphery at a lower end of the housing is attached to the outer periphery at an upper end of the flow channel body 21. The housing 17 accommodates the sensor substrate 15 on the inner peripheral side thereof.

The O-ring 18 is an annular elastic member disposed in a groove that is formed into an annular shape extending about the axis line X at a bottom portion of the recess 21d of the flow channel body 21. The O-ring 18 forms a seal region that is formed into an endless shape about the axis line X between the O-ring and the protective film body 11a. This seal region inhibits inflow of the fluid from the flow channel 21a to the pressure detection unit 10.

The operation and effects of the pressure detection device 100 of the first embodiment described above will be described.

According to the pressure detection device 100 of the first embodiment, the conductive protective film 11 is formed of a conductive fluororesin material and is connected to the outer holder 13 and the substrate holding member 16 that are maintained at the ground potential. Accordingly, static electricity generated on the fluid contact surface of the conductive protective film 11 due to a friction with the fluid is guided to the outer holder 13 and the substrate holding member 16 via the inside of the conductive protective film 11 from the fluid contact surface. Further, the conductive protective film 11 is disposed in contact with the pressure sensor 12 without involving another member, and the pressure of the fluid is highly accurately transmitted from the conductive protective film 11 to the pressure sensor 12.

Thus, the pressure detection device 100 of the first embodiment can highly accurately detect the pressure of the fluid, while preventing the occurrence of a defect that static electricity is accumulated on the fluid contact surface of the conductive protective film 11 which breaks contact between the pressure sensor 12 and the fluid.

In the pressure detection device 100 of the first embodiment, the conductive fluororesin material contains carbon nanotubes at a rate of 0.020 weight % to 0.030 weight %.

Even with such a small ratio of carbon nanotubes, 0.020 weight % or more of carbon nanotubes are dispersed in the fluororesin material to apply a constant conductivity to the conductive protective film 11, thereby making it possible to prevent charging of static electricity. This is because when tube-like carbon nanotubes having a predetermined length are used as a conductive material, only a small number of carbon nanotubes are needed to apply a conductivity, unlike other granular conductive materials such as carbon black and iron powder.

Further, since the rate of carbon nanotubes contained in the conductive fluororesin material is a small rate of 0.030 weight % or less, the contamination of the fluid due to the contact between the conductive protective film 11 and the fluid can be prevented, unlike other granular conductive materials such as carbon black and iron powder.

In the pressure detection device 100 of the first embodiment, the pressure sensor 12 includes the diaphragm 12a having a lower surface in contact with the conductive protective film 11, and the strain gauge 12b which is attached to the upper surface of the diaphragm 12a that is not in contact the conductive protective film 11. The diaphragm 12a is formed of a non-conductive material.

With this structure, the strain gauge 12b can be appropriately isolated from the outside and can highly accurately detect the pressure. When the diaphragm 12a in contact with the conductive protective film 11 is formed of a non-conductive material, the static electricity is not transmitted to the diaphragm 12a from the conductive protective film 11. However, since the conductive protective film 11 is connected to the outer holder 13 and the substrate holding member 16, the static electricity can be removed.

Second Embodiment

Next, a pressure detection device 100A according to a second embodiment of the present disclosure will be described with reference to the drawings.

The second embodiment is a modified example of the first embodiment. The second embodiment is similar to the first embodiment, unless otherwise specified below, and the components of the second embodiment that are similar to those of the first embodiment are denoted by the same reference numerals as those of the first embodiment, and the descriptions thereof are omitted.

The pressure detection device 100 of the first embodiment has a structure in which the band-like portion 11b of the conductive protective film 11 is sandwiched between the outer holder 13 and the substrate holding member 16, thereby maintaining the conductive protective film 11 at the ground potential.

On the other hand, in the pressure detection device 100A of the second embodiment, the conductive protective film 11 and the outer holder (ground portion) 13 are rendered conductive by a conductive portion 19 so that the conductive protective film 11 is maintained at the ground potential.

Figure 12:
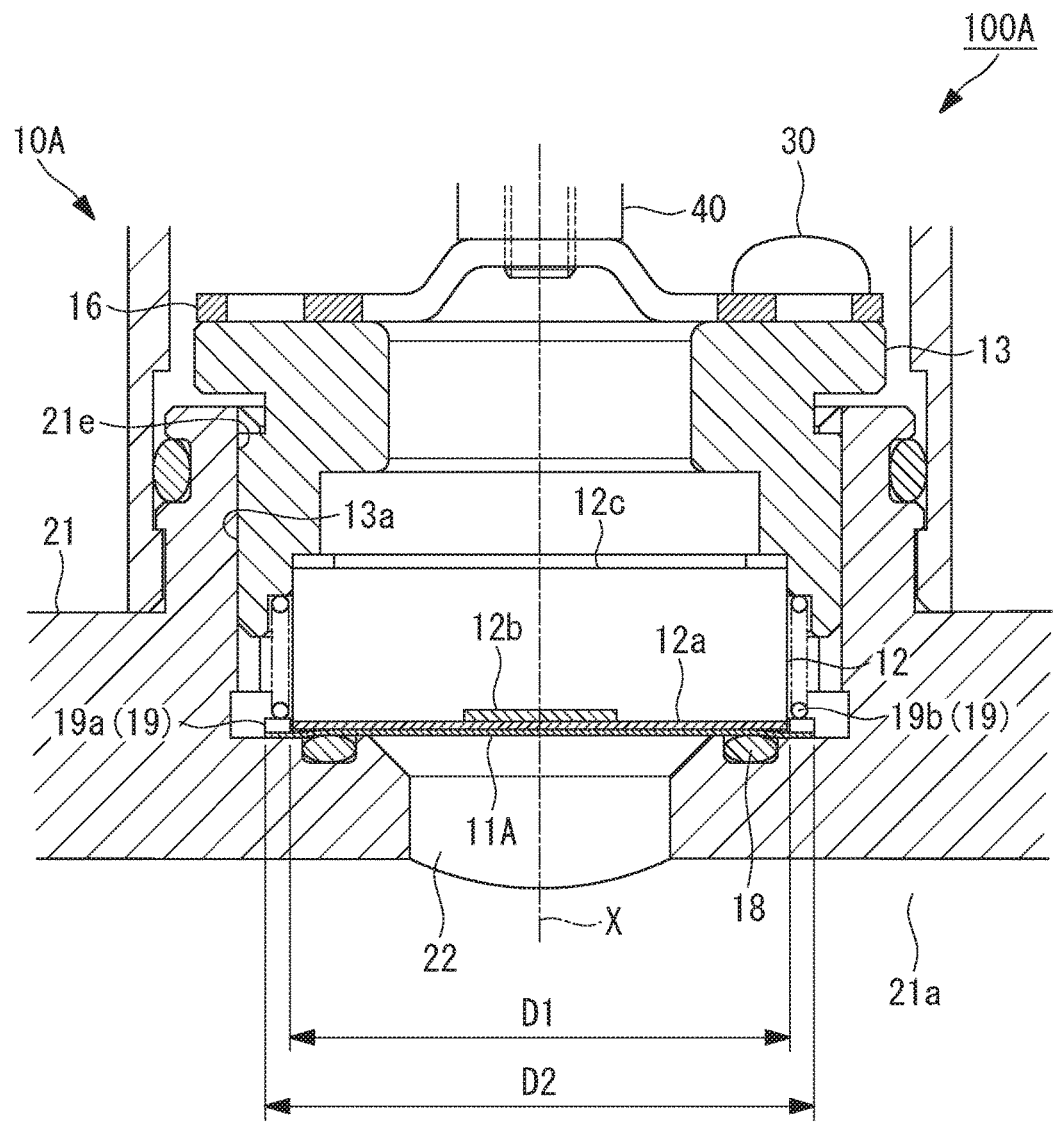
FIG. 12 is a partial enlarged view of a pressure detection unit included in a pressure detection device of a second embodiment.

As shown in FIG. 12, a pressure detection unit 10A included in the pressure detection device 100A of the second embodiment includes the conductive portion 19 which renders the conductive protective film 11 and the outer holder 13 conductive.

The conductive portion 19 includes: an annular member 19a which is formed into an annular shape about the axis line X and has a diameter D2 that is larger than a diameter D1 of the diaphragm 12a; and an annular spring 19b having a diameter that is larger than the diameter D1 and smaller than the diameter D2. The annular member 19a and the spring 19b are each made of metal (for example, stainless steel).

The spring 19b is disposed in a state where a lower end of the spring 19b is in contact with an upper surface of the annular member 19a due to an elastic force and an upper end of the spring 19b is in contact with the outer holder 13. The lower surface of the annular member 19a is in contact with the conductive protective film 11 due to an urging force that is supplied from the spring 19b and directed downward. Note that the diameter of the conductive protective film 11 is equal to or larger than the diameter D2 of the annular member 19a.

The conductive portion 19 renders the conductive protective film 11 and the outer holder 13 conductive via the annular member 19a and the spring 19b. The outer holder 13 is electrically conductive with the substrate holding member 16, and the substrate holding member 16 is electrically conductive with the ground line of the sensor substrate 15 via the spacer 40. Therefore, the conductive protective film 11 of the second embodiment is maintained at the ground potential.

Accordingly, the pressure detection device 100A of the second embodiment can highly accurately detect the pressure of the fluid, while preventing the occurrence of a defect that static electricity is accumulated on the fluid contact surface of the conductive protective film 11 which breaks contact between the pressure sensor 12 and the fluid.

Third Embodiment

Next, a pressure detection device 100B according to a third embodiment of the present disclosure will be described with reference to the drawings.

The third embodiment is a modified example of the first embodiment. The third embodiment is similar to the first embodiment, unless otherwise specified below, and the components of the third embodiment that are similar to those of the first embodiment are denoted by the same reference numerals as those of the first embodiment, and the descriptions thereof are omitted.

The pressure detection device 100 of the first embodiment and the pressure detection device 100A of the second embodiment are in-line type pressure detection devices having a structure in which the pressure detection unit 10 is disposed at a position in contact with the fluid flowing into the introduction flow channel 22 that is opened to the linear flow channel 21a.

Figure 13:
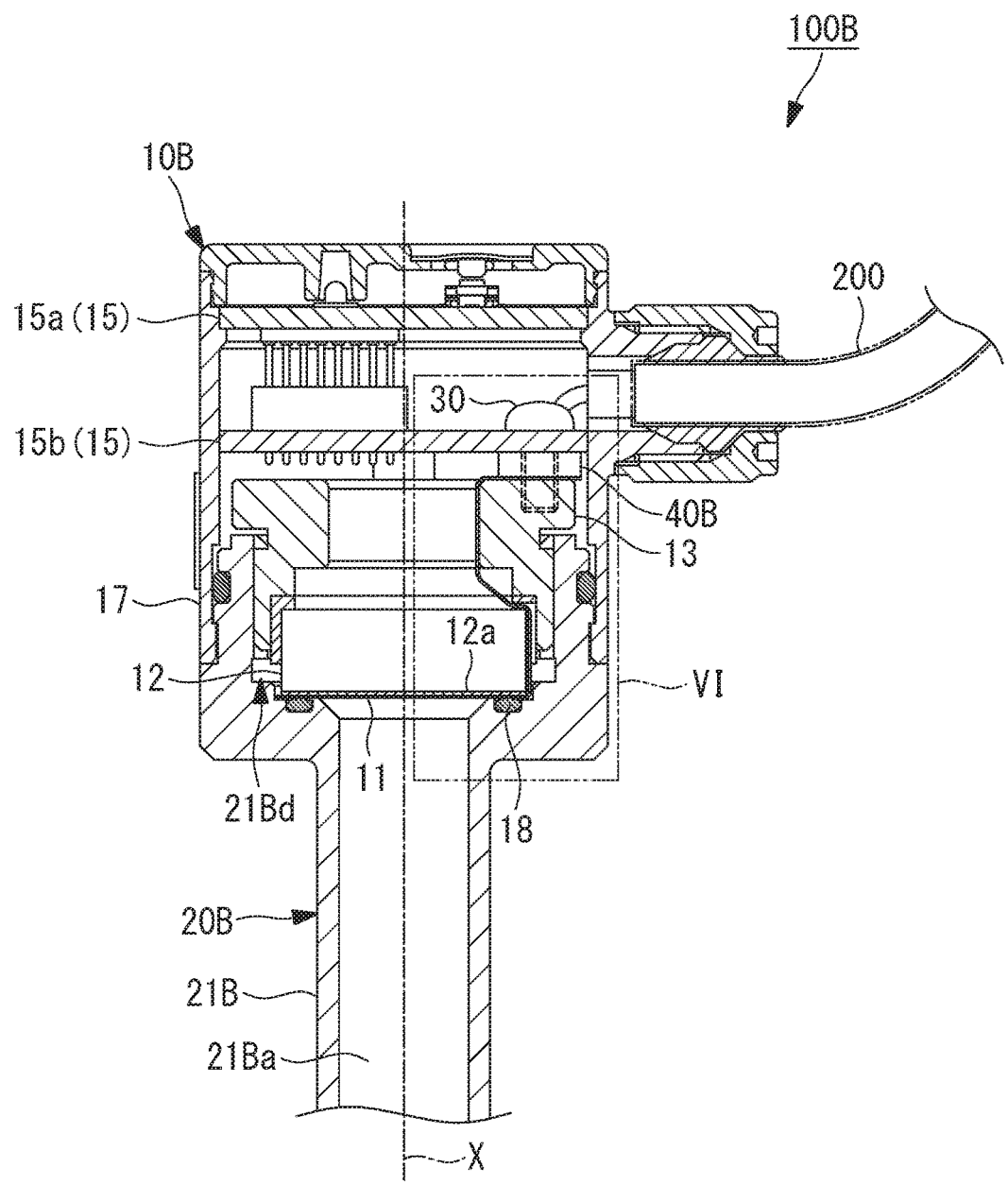
FIG. 13 is a longitudinal sectional view showing a pressure detection device of a third embodiment.
Figure 14:
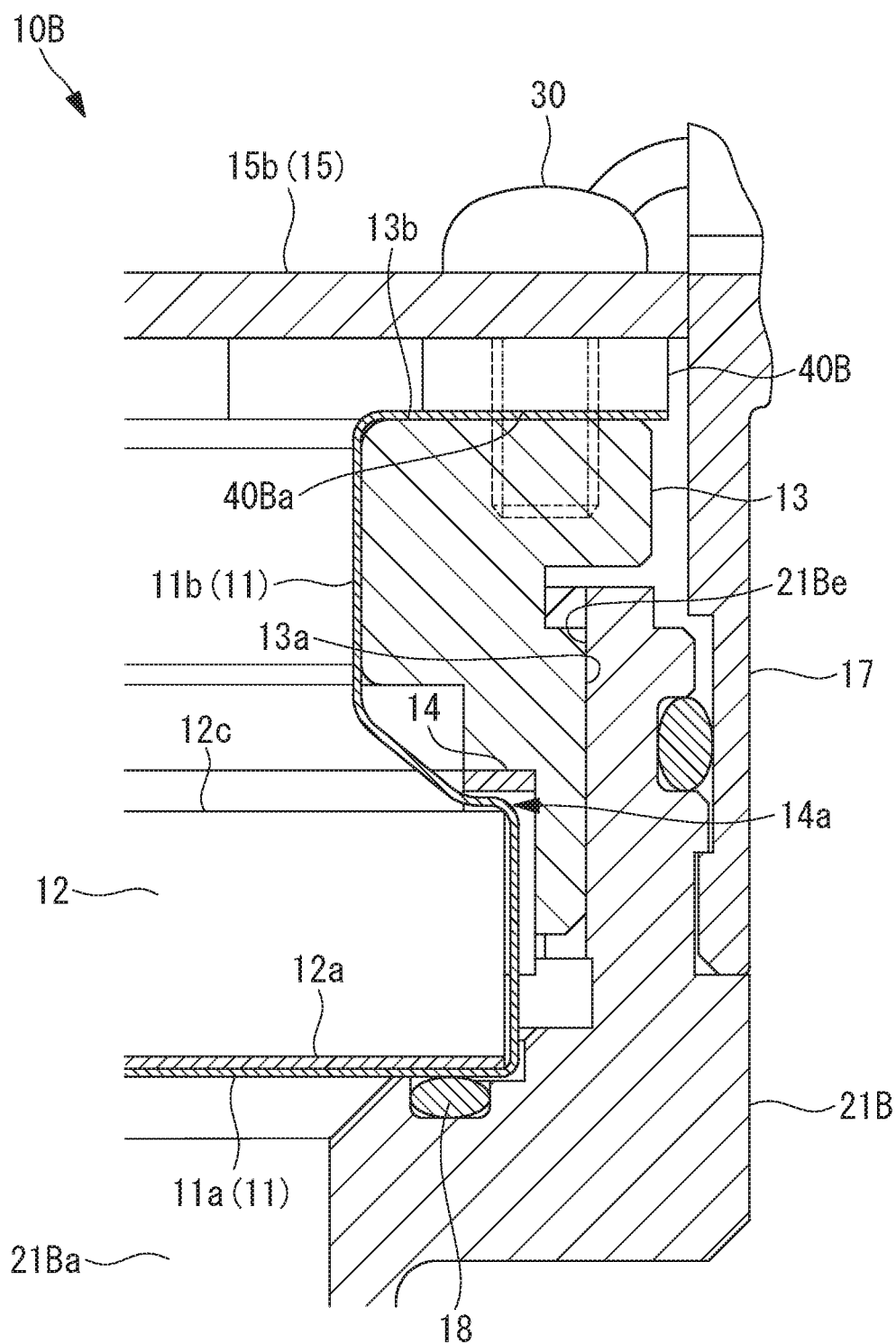
FIG. 14 is a partial enlarged view showing a portion indicated by "VI" in the pressure detection unit shown in FIG. 13.

On the other hand, the pressure detection device 100B of the second embodiment is a straight-type pressure detection device shown in FIG. 13 and FIG. 14 (which is a partial enlarged view showing a portion indicated by "VI" in the pressure detection unit shown in FIG. 13).

As shown in FIG. 13, the pressure detection device 100B of the second embodiment includes: a flow channel unit 20B including a flow channel body 21B in which a flow channel 21Ba linearly extending along the axis line X is formed; and a pressure detection unit 10B. The pressure detection unit 10B is held by the outer holder 13 in a state where the pressure detection unit 10B is disposed in a recess 21Bd that is formed in the flow channel body 21B.

The flow channel body 21B is connected to a branch position of a pipe (not shown) in which a main flow channel through which the fluid is circulated is formed. The flow channel body 21B guides the fluid branched from the main flow channel to the pressure detection unit 10B.

As shown in FIGS. 13 and 14, the second sensor substrate 15b of the third embodiment is fastened to the upper surface 13b of the outer holder 13 with the fastening bolts 30 in a state where a spacer 40B is sandwiched therebetween.

The outer holder 13, the spacer 40B, the fastening bolts 30 are each formed of a metal member such as stainless steel. The fastening bolts 30 are electrically connected to the ground line of the second sensor substrate 15b. Accordingly, the outer holder (ground portion) 13 and the spacer 40B (ground portion) 16 are maintained at the ground potential.

As shown in FIG. 14, the protective film body 11a is joined to the lower surface of the diaphragm 12a with an adhesive or the like. The band-like portion 11b is held in a state where the band-like portion 11b is sandwiched between the upper surface 13b of the outer holder 13 and the lower surface 40Ba of the spacer 40B. Since the conductive protective film 11 has a conductivity, the outer holder 13 and the spacer 40B are electrically conductive. Therefore, the conductive protective film 11 is maintained at the ground potential.

The second sensor substrate 15b of the third embodiment is directly fastened to the outer holder 13 without involving the substrate holding member 16 of the first and second embodiments. This is because the pressure detection unit 10B is disposed at a distance from the pipe in which the main flow channel is formed and thus there is no need to match the direction in which the cable 200 extends with the direction in which the main flow channel extends so as to reduce the installation area.

The invention claimed is:

1. A pressure detection device comprising:
   a pressure detection unit configured to detect a pressure to be transmitted to a pressure detection portion; and
   a flow channel unit having a flow channel formed therein, the pressure detection unit being disposed on the flow channel unit,
   wherein the pressure detection unit includes:
      the pressure detection portion; and
      a thin film protective portion disposed in contact with the pressure detection portion, the thin film protective portion breaking contact between the pressure detection portion and a fluid, and
   wherein the thin film protective portion is formed of a conductive fluororesin material including a fluororesin material and a conductive material dispersed in the fluororesin material, and is connected to a ground portion maintained at a ground potential.

2. The pressure detection device according to claim 1, wherein the conductive material is carbon nanotubes, and
   wherein the conductive fluororesin material contains the carbon nanotubes at a rate of 0.020 weight % to 0.030 weight %.

3. The pressure detection device according to claim 1, wherein the pressure detection portion includes:
   a thin film diaphragm including a first surface in contact with the thin film protective portion; and
   a resistor attached to a second surface of the thin film diaphragm, the second surface of the thin film diaphragm being not in contact with the thin film protective portion, and
   wherein the thin film diaphragm is formed of a non-conductive material.

4. The pressure detection device according to claim 2, wherein the pressure detection portion includes:
   a thin film diaphragm including a first surface in contact with the thin film protective portion; and
   a resistor attached to a second surface of the thin film diaphragm, the second surface of the thin film diaphragm being not in contact with the thin film protective portion, and
   wherein the thin film diaphragm is formed of a non-conductive material.

\* \* \* \* \*